United States Patent
Ioffe et al.

(10) Patent No.: US 12,301,509 B2
(45) Date of Patent: May 13, 2025

(54) SYSTEMS AND METHODS FOR NETWORK COEXISTENCE

(71) Applicant: Apple Inc., Cupertino, CA (US)

(72) Inventors: Anatoliy S Ioffe, Sunnyvale, CA (US); Amit Freiman, San Jose, CA (US); Alexander Sayenko, Munich (DE); Sumit Verma, San Diego, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 424 days.

(21) Appl. No.: 17/948,001

(22) Filed: Sep. 19, 2022

(65) Prior Publication Data
US 2024/0097861 A1 Mar. 21, 2024

(51) Int. Cl.
*H04J 4/00* (2006.01)
*H04L 5/00* (2006.01)

(52) U.S. Cl.
CPC .......... *H04L 5/0073* (2013.01); *H04L 5/0007* (2013.01); *H04L 5/0092* (2013.01); *H04L 5/0094* (2013.01)

(58) Field of Classification Search
CPC ... H04L 5/0073; H04L 5/0007; H04L 5/0092; H04L 5/0094
See application file for complete search history.

(56) References Cited

U.S. PATENT DOCUMENTS

| | | | | |
|---|---|---|---|---|
| 2023/0188384 A1* | 6/2023 | Claffey | ............... | H04L 25/022 |
| | | | | 375/262 |
| 2023/0273291 A1* | 8/2023 | Ozturk | .................. | G01S 7/006 |
| | | | | 342/52 |
| 2024/0097862 A1* | 3/2024 | Ioffe | ..................... | H04L 5/0094 |
| 2024/0187829 A1* | 6/2024 | Griot | .................... | H04W 4/20 |

FOREIGN PATENT DOCUMENTS

| | | | | |
|---|---|---|---|---|
| KR | 102566968 B1 * | 8/2023 | | |
| WO | WO-2022020830 A1 * | 1/2022 | ........... | H04B 7/0602 |
| WO | WO-2022127634 A1 * | 6/2022 | ............. | G03B 21/00 |
| WO | WO-2024118253 A1 * | 6/2024 | ............. | G01S 13/75 |

\* cited by examiner

*Primary Examiner* — Thai Dinh Hoang
(74) *Attorney, Agent, or Firm* — FLETCHER YODER PC

(57) ABSTRACT

User equipment may transmit and receive wireless signals to and from various communication networks. Furthermore, user equipment may indicate usage capabilities to the various wireless communication networks to enable the user equipment to transmit and/or receive wireless signals to and from at least two different communication networks. In particular, the user equipment may indicate usage capabilities of supporting both Frequency Range 2 (FR2) wireless signals of a fifth generation (5G) network and 7-24 gigahertz (GHz) wireless signals of a sixth generation (6G) network in an intermediate frequency range of the user equipment. The communication network(s) may then configure and/or schedule the user equipment based on the usage capabilities to enable the user equipment to simultaneously or non-simultaneously communicate using both the FR2 wireless signals and the 7-24 GHz wireless signals while preventing interference in the intermediate frequency range of the user equipment.

20 Claims, 5 Drawing Sheets

SYSTEMS AND METHODS FOR NETWORK COEXISTENCE

BACKGROUND

The present disclosure relates generally to wireless communication, and more specifically to coexistence between multiple networks on user equipment (UE) (e.g., mobile wireless communication devices).

User equipment (UE) may include transmitters and receivers coupled to antennas to enable the UE to transmit wireless signals to and to receive wireless signals from different wireless communication network(s). However, frequencies of the transmitted and/or received signals over the different network(s) may overlap, resulting in interference and even signal loss.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment may include a transmitter, a first receiver, a second receiver, and one or more processors coupled to the transmitter, the first receiver, and the second receiver. The one or more processors may transmit, using the transmitter, a first indication of a first available frequency sub-range of an intermediate frequency range that is available to communicate signals. Further the one or more processors may transmit, using the transmitter, a second indication of a second available frequency sub-range of a frequency range outside the intermediate frequency range that is available to communicate signals. The one or more processors may additionally a first signal having a first frequency in the first available frequency sub-range based on the first indication using the first receiver, and receive a second signal having a second frequency in the frequency sub-range based on the second indication using the second receiver. In addition, the one or more processors may convert the second signal to a third frequency in a second available frequency sub-range of the intermediate frequency range.

In another embodiment, a method may include transmitting, via a transceiver of an electronic device, a first indication of a first available frequency sub-range of an intermediate frequency range that is available to support a first signal carrier. Further, the method may include transmitting, via the transceiver, a second indication of a second available frequency sub-range of a frequency range outside of the intermediate frequency range that is available to support a second signal carrier. The method may additionally include receiving a configuration from a first network, a second network, or both, to communicate using the first available frequency sub-range and the second available frequency sub-range based on the first indication and the second indication at the transceiver. Furthermore, the processing circuitry of the electronic device may convert a signal of the second available frequency sub-range to the intermediate frequency range. In addition, the method may include receiving a schedule from the first network, the second network, or both for communicating using the first available frequency sub-range during a first time period and communicating using the second available frequency sub-range during a second time period based on the first indication and the second indication at the transceiver.

In another embodiment, a tangible, non-transitory computer-readable medium, comprising computer-readable instructions that, when executed by processing circuitry of an electronic device, may cause the processing circuitry to transmit, via a first transmitter of the electronic device, a first indication of a first available frequency sub-range of an intermediate frequency range that is available to transmit a first signal having a first frequency in the first available frequency sub-range. Further the processing circuitry may transmit, via a second transmitter of the electronic device, a second indication of a second available frequency sub-range outside of the intermediate frequency range that is available to transmit a second signal having a second frequency in the second available frequency sub-range. The processing circuitry may additionally transmit, via the first transmitter, the first signal based on the first indication. In addition, the processing circuitry may convert a third signal having a third frequency in the intermediate frequency range to the second signal having the second frequency based on the second indication, and transmit, via a second transmitter, the second signal based on the second indication.

In another embodiment, a base station may include a transmitter, a receiver, and one or more processors coupled to the transmitter and the receiver. The one or more processors may receive a first indication of a first available frequency sub-range of an intermediate frequency range that is available to communicate a first signal having a first frequency in the first available frequency sub-range at the receiver. Further, the one or more processors may receive a second indication of a second available frequency sub-range outside of the intermediate frequency range that is available to communicate a second signal having a second frequency in the second available frequency sub-range at the receiver, and transmit, using the transmitter, the first signal or the second signal based on the first indication and the second indication.

In another embodiment, a method may include receiving a first indication of a first available frequency sub-range of an intermediate frequency range from an electronic device that is available to support a first signal carrier at a transceiver of a base station. Further, the method may include receiving a second indication of a second available frequency sub-range outside of the intermediate frequency range from the electronic device that is available to support a second signal carrier at the transceiver. The method may additionally include transmitting, via the transceiver, a configuration to communicate using the first available frequency sub-range and the second available frequency sub-range based on the first indication and the second indication at the transceiver. In addition, the electronic device may convert a signal of the second available frequency sub-range to the intermediate frequency range.

In yet another embodiment, a tangible, non-transitory computer-readable medium, including computer-readable instructions that, when executed by processing circuitry of a base station, may cause the processing circuitry to receive, at a receiver of the base station, a first indication of a first available frequency sub-range of an intermediate frequency range that is available to communicate a first signal from user equipment. Further the processing circuitry may receive, at the receiver, a second indication of a second available frequency sub-range outside of the intermediate frequency range that is available to communicate a second signal from the user equipment. Additionally, the processing circuitry may transmit, via a transmitter of the base station, a schedule for communicating using the first available frequency sub-range during a first time period and communicating using the second available frequency sub-range during a second time period based on the first indication and the second indication.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
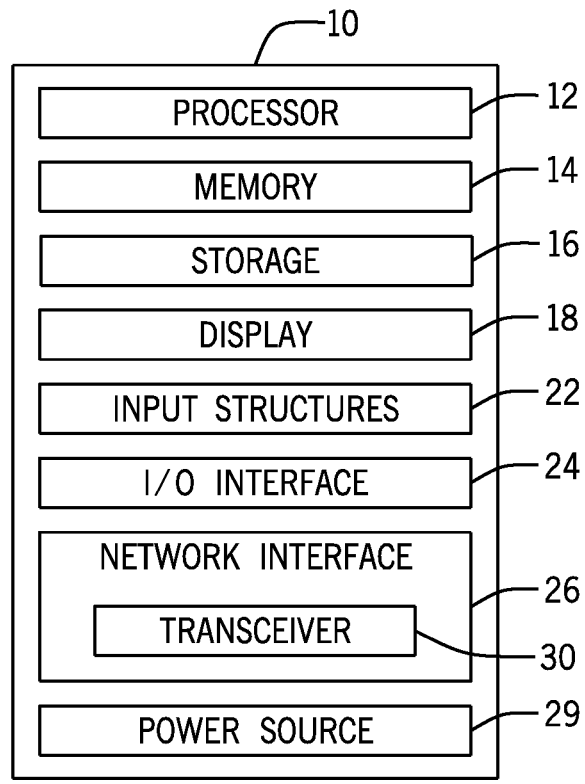
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

When transmitting and/or receiving the wireless signals, user equipment (UE) may utilize a heterodyne radio frequency (RF) architecture (e.g., via a heterodyne transceiver) to convert a wireless signal carrier to a lower frequency to reduce interference with other signals in the UE and/or facilitate signal processing. For example, the heterodyne transceiver may down-convert received wireless signal carriers for signal processing before the wireless signals of the received wireless signal carriers are used by one or more components of the UE. Furthermore, in some embodiments, the heterodyne transceiver may up-convert transmitted wireless signal carriers from a lower frequency to a higher frequency (e.g., within a higher frequency range) for transmission of signals at the higher frequency. In addition, the received and/or transmitted signal carriers may have relatively high frequencies, and the UE (e.g., via a heterodyne receiver/transceiver) may down-convert the received frequency bands and/or carriers to a lower frequency. For example, one or more frequency carriers of the received and/or transmitted frequency bands may include a millimeter wave (mmWave) frequency (e.g., within a fifth generation (5G) New Radio (NR) Frequency Range 2 (FR2), above 24 gigahertz (GHz), between 24 GHz-52.6 GHz, and so on), whereas the intermediate frequency range to which the UE down-converts the carrier may be within a lower frequency range (e.g., 7-24 GHz, 10-24 GHz, 5-24 GHz, and so on).

The UE may determine the intermediate frequency range to which the FR2 carriers are down-converted based on a frequency bandwidth of each of the FR2 carriers and/or a total aggregate frequency bandwidth of the FR2 channels or bands. However, in some embodiments, the intermediate frequency range may be limited by capabilities of the UE and/or may be subject to system constraints of the UE, such as crosstalk effects (e.g., leakage of signals into adjacent channels). For example, the UE may be limited to down-converting the FR2 carriers to a defined portion of the intermediate frequency range, because other adjacent intermediate frequency bands (e.g., or channels) may be allocated to receive/transmit additional wireless signals (e.g., Bluetooth). Moreover, with the emergence of 7-24 GHz wireless communication network(s) (e.g., in the sixth generation (6G) spectrum, having 7-24 GHz carriers), down-converting the FR2 carriers to the intermediate frequency range may interfere with the UE capabilities of receiving signals from and/or transmitting signals to these 7-24 GHz wireless communication network(s).

This disclosure is directed to a UE that may indicate frequency band usage capabilities to one or more wireless communication network(s) to enable the UE to communicate with (e.g., transmit and/or receive wireless signals) multiple wireless communication networks (e.g., an FR2 network and a 6G network (operating in the 7-24 GHz frequency range)). In some embodiments, the UE may indicate to the one or more wireless communication networks capabilities of supporting both FR2 signal carriers and 7-24 GHz signal carriers in an intermediate frequency range of the UE (in the case of the FR2 signal carriers, down-converting the carriers to the intermediate frequency range), and the wireless communication network(s) may then configure and/or schedule the UE based on the capabilities provided by the UE. In this way, the wireless communication network(s) may enable the UE to support both the FR2 signal carriers and the 7-24 GHz signal carriers while preventing interference in the intermediate frequency range of the UE (e.g., between the down-converted FR2 signal carriers and the 7-24 GHz signal carriers). In particular, the embodiments herein may enable the UE to simultaneously transmit and/or receive signals having frequencies in the 7-24 GHz frequency range and transmit and/or receive signals having frequencies in the FR2 range, while down-converting the FR2 signals to frequency ranges that do not overlap with the 7-24 GHz signals. In this manner, the disclosed embodiments and/or methods enable coexistence between FR2 bands (5G networks) and 7-24 GHz bands (6G networks), while preventing interference between the 7-24 GHz wireless signals and the down-converted FR2 wireless signals.

In some embodiments, the UE may indicate to the wireless communication network capabilities (e.g., frequency band usage capabilities), such as which frequency range (e.g., band or channel) configurations the UE may support (e.g., communicate via or transmit/receive wireless signals). In particular, the UE may inform (e.g., indicate to) the wireless communication network at which frequency ranges (e.g., bands or channels) in the intermediate frequency range it may transmit and/or receive the 7-24 GHz wireless signals, and at which FR2 frequency ranges (e.g., bands or channels) it may transmit and/or receive (e.g., that, when down-converted to the intermediate frequency range, do not interfere or overlap with the 7-24 GHz wireless signals). The wireless communication network may then configure and/or schedule the UE to transmit and/or receive the 7-24 GHz wireless signals using a first transceiver (e.g., allocate a first frequency range, such as a channel, in the intermediate frequency range), and transmit and/or receive the FR2 wireless signals using a second transceiver. Additionally, the UE may down-convert the FR2 signals to a second frequency range, such as a second channel, in the intermediate frequency range, such that the 7-24 GHz wireless signals do not interfere with the down-converted FR2 wireless signals in the intermediate frequency range. It should be understood that, in some embodiments, the UE may transmit and/or receive both the 7-24 GHz wireless signals and the FR2 wireless signals using a common transceiver. In either case, the UE may simultaneously or non-simultaneously transmit and/or receive wireless signals using both the 7-24 GHz signal carriers and the FR2 signal carriers.

Additionally or alternatively, the UE may indicate to the wireless communication network capabilities to communicate via one or more frequency ranges (e.g., channels) within the 7-24 GHz frequency range and/or the FR2 range (e.g., based on its down-converted range) and additionally include one or more frequency range limits. For instance, a 7-24 GHz signal carrier may interfere (e.g., overlap) with down-converted FR2 signal carrier within the intermediate frequency range of the UE. In this case, as further discussed herein, the wireless communication network may receive the UE's capabilities and the one or more frequency range limits and configure the UE to support both the interfering 7-24 GHz signal carrier and the interfering down-converted FR2 signal carrier. Furthermore, the wireless communication network may schedule (e.g., allocate) the UE to support the interfering 7-24 GHz signal carrier and the FR2 signal carrier in accordance with one or more restrictions (e.g., frequency restrictions and/or time domain restrictions). The one or more restrictions may be based on the received capabilities of the UE and/or the received one or more frequency range limits. In addition, the allocation of the 7-24 GHz signal carriers or the FR2 signal carriers by the wireless communication network may be dynamic (e.g., active), in that the wireless communication network may schedule the UE to transition from receiving and/or transmitting using the FR2 signal carrier to receiving and/or transmitting using the 7-24 GHz signal carriers, or vice versa. The transition may depend on one or more signal characteristics, such as signal strength of the wireless communication network(s) (e.g., an FR2 network and/or a 6G network) and/or the indicated capabilities of the UE. That is, either or both networks may schedule the UE on the better performing network. In this way, the UE may actively switch operation between receiving and/or transmitting using at least a portion of the FR2 signal carriers and at least a portion of the 7-24 GHz signal carriers.

In some embodiments, the wireless communication network may configure the UE to support 7-24 GHz signal carriers and FR2 signal carriers that, when down-converted, overlap or interfere with the 7-24 GHz signal carriers in the intermediate frequency range of the UE, but schedule each of the two signal carriers at different times (e.g., implementing a time-division multiplexing approach). For example, the wireless communication network may additionally or alternatively schedule (e.g., allocate to) the UE at least a portion of the 7-24 GHz signal carriers and at least a portion of the FR2 signal carriers based on (e.g., in accordance with) one or more frequency restrictions (e.g., frequency range restrictions, bandwidths that are non-interfering). In particular, the wireless communication network may configure the UE by, for example, utilizing a Media Access Control (MAC) layer to dynamically mute (e.g., deactivate) at least a portion (e.g., carriers) of the FR2 carrier signals and/or the 7-24 GHz signal carriers that, when the portion of the FR2 signal carriers are down-converted, may interfere with each other on the UE. In this way, the UE may simultaneously receive both the FR2 wireless signals and 7-24 GHz wireless signals without a latency penalty associated with handover techniques Furthermore, in some embodiments, the wireless communication network may configure the UE to support 7-24 GHz signal carriers and FR2 signal carriers that when down-converted overlap with the 7-24 GHz signal carriers in the intermediate frequency range of the UE. The wireless communication network may additionally schedule (e.g., allocate to) the UE at least a portion of the 7-24 GHz signal carriers and at least a portion of the down-converted FR2 signal carriers based on one or more time domain restrictions (e.g., supporting one of either the 7-24 GHz signal carriers or the down-converted FR2 signal carriers at any given time). In other words, the UE may be configured and/or scheduled by the wireless communication network to communicate with the wireless communication network(s) using the 7-24 GHz signal carriers in a first time period and communicate with the wireless communication network(s) using the FR2 signal carriers in a second time period. In this way, the UE may actively switch between receiving and/or transmitting the 7-24 GHz wireless signals and the FR2 wireless signals without a latency penalty associated with handover techniques.

With the foregoing in mind, FIG. 1 is a block diagram of user equipment 10 (e.g., an electronic device, a wireless communication device, a mobile communication device, and so on), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the mmWave frequency range (e.g., 24.25-300 gigahertz (GHz) or sub-THz) that defines and/or enables frequency ranges used for wireless communication. The network interface 26 of the user equipment 10 may allow communication over the aforementioned network(s) (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30 (e.g., a heterodyne transceiver). In some embodiments, all or portions of the transceiver 30 may be disposed within the processor 12. The transceiver 30 may support transmission and receipt of various wireless signals (e.g., user data) via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
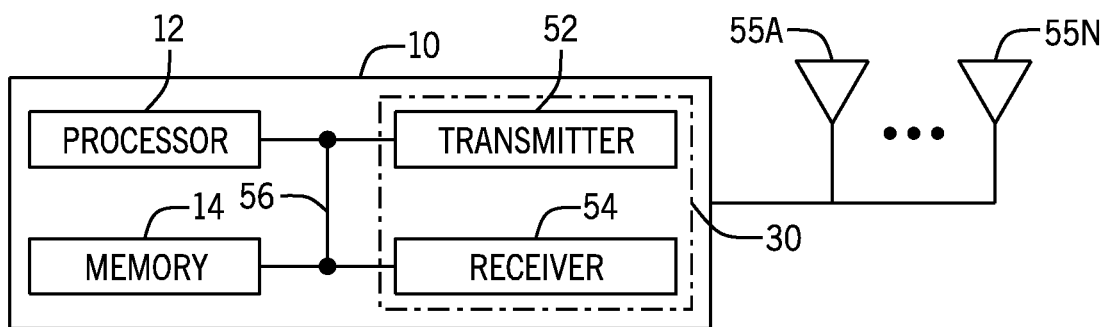
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
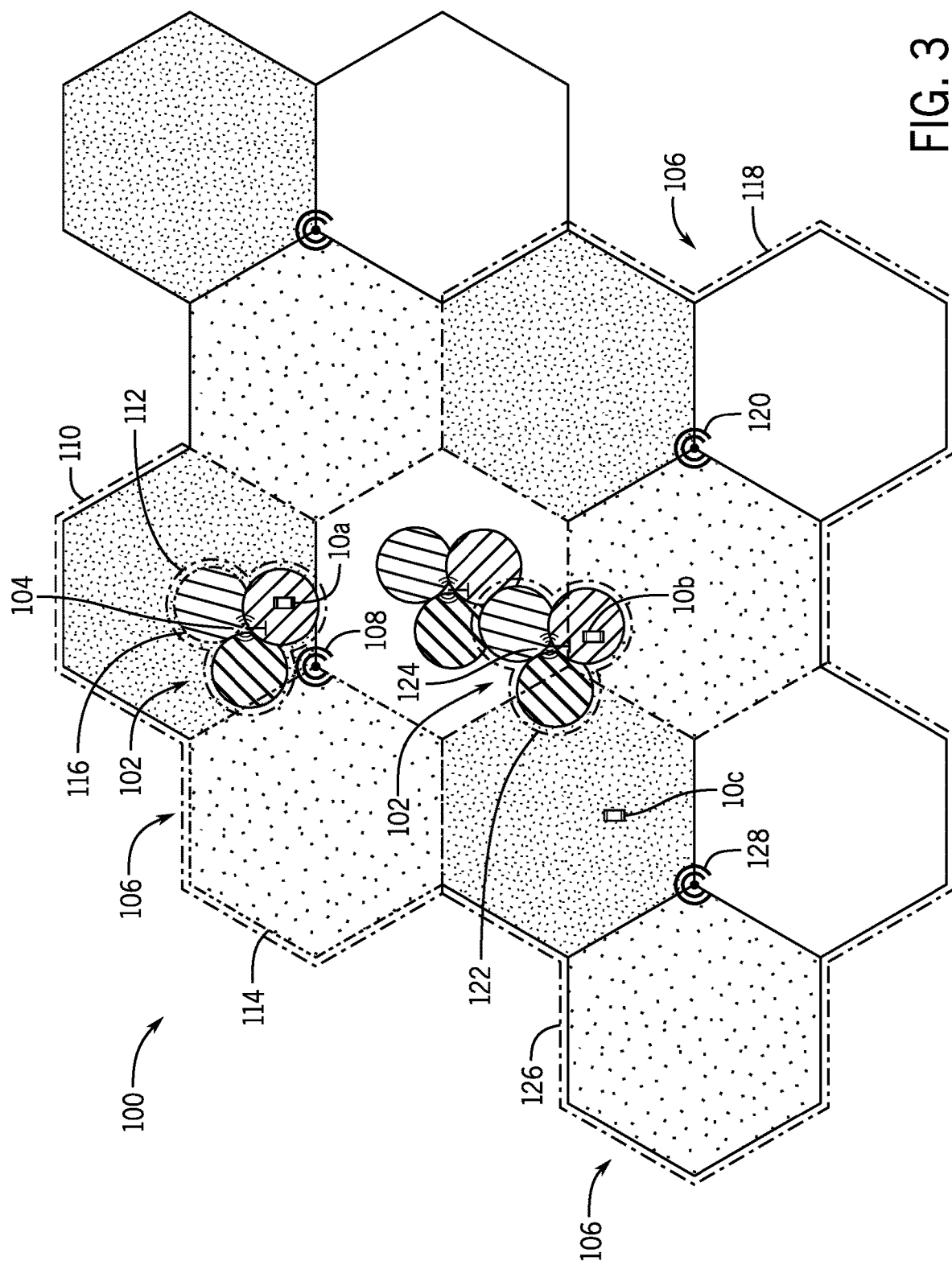
FIG. 3 is a schematic diagram of a communication system including the user equipment of FIG. 1 communicatively coupled to multiple wireless communication networks, according to embodiments of the present disclosure.

With the foregoing in mind, FIG. 3 is a schematic diagram of a communication system 100 including the UE 10 (e.g., UE 10a, UE 10b, UE 10c) of FIG. 1 communicatively coupled to multiple communication networks, according to embodiments of the present disclosure. For instance, the UE 10 may communicatively couple to a first communication network 102 (e.g., via a first base station 104) and a second communication network 106 (e.g., via a second base station 108). As discussed herein, the first communication network 102 may include FR2 (5G) wireless communication network 102, and the second communication network 106 may include 7-24 GHz (6G) wireless communication network 106. While FIG. 3 illustrates coverage areas of the FR2 and the 7-24 GHz wireless communication network 102, 106 it should be understood that any suitable communication network(s) are contemplated (e.g., 3G, 4G/LTE, 5G FR1, beyond 6G, Wi-Fi, and so on). In particular, FIG. 3 illustrates UE 10 (e.g., UE 10a, UE 10b, UE 10c) in various locations with respect to 7-24 GHz coverage areas (e.g., geographical coverage area) of the 7-24 GHz wireless communication network 106 (e.g., 7-24 GHz (6G) base stations providing 7-24 GHz (6G) frequency range wireless service) and FR2 coverage areas of the FR2 wireless communication network 102 (e.g., FR2 (5G) base stations providing FR2 (5G) wireless service), which may overlay at least a portion of the coverage area of the 7-24 GHz wireless communication network 106, according to embodiments of the present disclosure. In addition, each cell cluster may correspond to the coverage area (e.g., the first 7-24 GHz coverage area 110 and/or the first FR2 coverage area 112) of a respective base station (e.g., the 7-24 GHz base station 108 and/or the FR2 base station 104) of the wireless communication network(s) (e.g., the 7-24 GHz wireless communication network 106 and/or the FR2 wireless communication network 102).

For example, as illustrated in FIG. 3, a first cell cluster may correspond to a first 7-24 GHz coverage area 110 of a first 7-24 GHz base station 108 and may include one or more cells 114 (e.g., supported by the 7-24 GHz base station 108) arranged with the 7-24 GHz base stations 108 in the center. Furthermore, a second cell cluster may correspond to a first FR2 coverage area 112 of a first FR2 base station 104 and may include one or more cells 116 (e.g., supported by the first FR2 base station 104) arranged with the first FR2 base station 104 in the center. As illustrated in FIG. 3, each cell (e.g., each cell cluster) is supported by a respective base station (e.g., one of the 7-24 GHz base stations 108 or one of the FR2 base stations 104). In particular, the 7-24 GHz base stations 108 and/or the FR2 base stations 104 may have antennas configured in an omnidirectional configuration and provide coverage to an area for wireless service. In other words, the one or more cells (e.g., each cell cluster) may be representative of the 7-24 GHz and/or the FR2 coverage areas (e.g., geographical coverage area) provided by a respective 7-24 GHz base station and/or respective FR2 base station.

In some embodiments, as represented by a first scenario of FIG. 3, the location (e.g., geographical location) of the UE 10a may be near a center of the first cell cluster (e.g., a first 7-24 GHz coverage area 110) of the first 7-24 GHz base station 108 and within a first cell of the second cell cluster (e.g., the first FR2 coverage area 112) of the first FR2 base station 104. In this case, the UE 10a may communicatively couple to the first 7-24 GHz base station 108 and/or the first FR2 base station 104, and as a result may transmit and/or receive wireless signals over a wireless service of the 7-24 GHz wireless communication network 106 and/or FR2 wireless communication network 102 provided by the respective first 7-24 GHz base station 108 and/or the first FR2 base station 104. In other embodiments, as represented by a second scenario of FIG. 3, the location (e.g., geographical location) of the UE 10b may be near a perimeter edge of a third cell cluster (e.g., a second 7-24 GHz coverage area 118 of a second 7-24 GHz base station 120) and within a first cell of a fourth cell cluster (e.g., a second FR2 coverage area 122 of a second FR2 base station 124). Moreover, in the second scenario, the UE 10b may communicatively couple to the second 7-24 GHz base station 120 and/or the second FR2 base station 124, and as a result may transmit and/or receive wireless signals over the wireless service of the 7-24 GHz wireless communication network 106 and/or FR2 wireless communication network 102 provided by the respective second 7-24 GHz base station 120 and/or the second FR2 base station 124. In additional embodiments, as represented by a third scenario of FIG. 3, the location (e.g., geographical location) of the UE 10c may be within a fifth cell cluster (e.g., a third 7-24 GHz coverage area 126 of a third 7-24 GHz base station 128) and not within the FR2 coverage area of any of the FR2 base stations. In this case, the UE 10c may communicatively couple to the third 7-24 GHz base station 128, and thus transmit and/or receive wireless signals over a wireless service of the 7-24 GHz wireless communication network 106 provided by the third 7-24 GHz base station 128.

Moreover, the UE 10 (e.g., UE 10a, 10b, 10c) may link (e.g., communicatively couple) to one or more wireless communication network(s) (e.g., one or more 7-24 GHz base stations 108, 120, 128 and/or one or more FR2 base stations 104, 124) and may monitor link conditions to determine one or more signal characteristics associated with a respective base station of the one or more wireless communication network(s) (e.g., the 7-24 GHz wireless communication network 106 and/or the FR2 wireless communication network 102). The one or more signal characteristics may include a signal quality (e.g., Reference Signal Received Quality (RSRQ), signal-to-noise ratio (SNR), signal-to-interference & noise ratio (SINR)), a signal strength (e.g., Reference Signal Received Power (RSRP)), a signal power, a signal delivery, or the like. For example, a link of the first 7-24 GHz base station 108 may enable an acceptable signal quality (e.g., above a threshold) due to close proximity between the first 7-24 GHz base station 108 and the UE 10a. In another example, not illustrated in FIG. 3, a blockage between the first FR2 base station 104 and the user equipment 10a may result in poor signal strength (e.g., below the threshold). By monitoring the link of each 7-24 GHz base station and/or the FR2 base station, the UE 10 may determine the one or more signal characteristics (e.g., receive signal power, receive signal quality, and so on) of the wireless signals received from the 7-24 GHz base stations and/or the FR2 base stations. For example, the UE 10 may determine the one or more receive signal characteristics of the received wireless signals based on one or more measurements of the received wireless signals that may be received at the antenna 55 from the 7-24 GHz base stations 108, 120, 128 and/or the FR2 base stations 104, 124. The UE 10 may then indicate (e.g., provide) the one or more signal characteristics to the 7-24 GHz wireless communication network 106, FR2 wireless communication network 102, or both.

Furthermore, the location (e.g., geographical location) of the UE 10 may be associated (e.g., correlated) with the one or more signal characteristics of the wireless signals of the 7-24 GHz wireless communication network 106 and/or the FR2 wireless communication network 102. For example, the UE 10a of the first scenario may receive wireless signals from the 7-24 GHz wireless communication network 106 at a greater signal strength than the UE 10b of the second scenario due to the location of the UE 10a and UE 10b relative to the respective first and second 7-24 GHz base stations 108, 120 (e.g., a distance of the UE 10a from the first 7-24 GHz base station 108 of the first scenario compared to a distance of the UE 10b from the second 7-24 GHz base station 120 of the second scenario). Whereas, the signal strengths of the wireless signals of the first and second FR2 base stations 104, 124 may be relatively the same with respect to the UE 10a and the UE 10b of the first and second scenarios due to the locations (e.g., the distance) of the UE 10a and UE 10b relative to the respective first and second FR2 base stations 104, 124. While FIG. 3 illustrates three location scenarios of the UE 10, it should be understood that the techniques disclosed herein may provide for any number of location scenarios of the UE 10 (e.g., any location of the UE 10 within the FR2 coverage areas of the FR2 wireless communication network 102 and/or the 7-24 GHz coverage areas of the 7-24 GHz wireless communication network 106).

Further, in the illustrated example, the cell clusters of the 7-24 GHz base stations 108, 120, 128 each include three cells (e.g., supported by a respective 7-24 GHz base station), and the cell clusters of the FR2 base stations 104, 124 each include three cells (e.g., supported by a respective FR2 base station). However, each of the cell clusters of the 7-24 GHz base stations and/or the FR2 base stations may include any suitable number of cells (e.g., two cells, four cells, ten cells, and so on) that are supported by any suitable number of respective 7-24 GHz base stations and/or FR2 base stations. In addition, as illustrated in FIG. 3, the coverage area of the FR2 wireless communication network 102 (e.g., represented by circles) may be non-uniform when compared to the coverage area of the 7-24 GHz wireless communication network 106 (e.g., represented by interconnecting hexagonal shapes).

It should be understood that the present embodiments disclosed herein provide for techniques that enable the coexistence between a first wireless communication network and a second wireless communication network communicatively coupled to the UE 10 while preventing interference between the wireless signals provided by the first communication network and the wireless signals provided by the second communication network. In particular, the first wireless communication network may include FR2 signal carriers (5G networks) and the second communication network may include 7-24 GHz signal carriers (6G). Furthermore, the UE 10 (e.g., UE 10a, UE, 10b, UE 10c) may support (e.g., communicate via, transmit and/or receive wireless signals using) both the FR2 signal carriers (e.g., and down-convert the FR2 wireless signals) and the 7-24 GHz signal carriers (e.g., the 7-24 GHz wireless signals) without interference. To do so, the UE 10 may communicatively couple to and indicate configuration capabilities (e.g., provide frequency band usage capabilities) to the 7-24 GHz wireless communication network 106, the FR2 wireless communication network 102, or both. The 7-24 GHz and/or the FR2 wireless communication networks 106, 102 may then configure (e.g., and/or schedule) the UE 10 to support at least a portion of signal carriers provided by the FR2 base stations 104, 124 and/or the 7-24 GHz base stations 108, 120, 128, such that the signal carriers (e.g., wireless signals) provided by the 7-24 GHz wireless communication network 106 and the FR2 wireless communication network 102 do not interfere on the UE 10 (e.g., on the intermediate frequency range of the UE 10).

Figure 4:
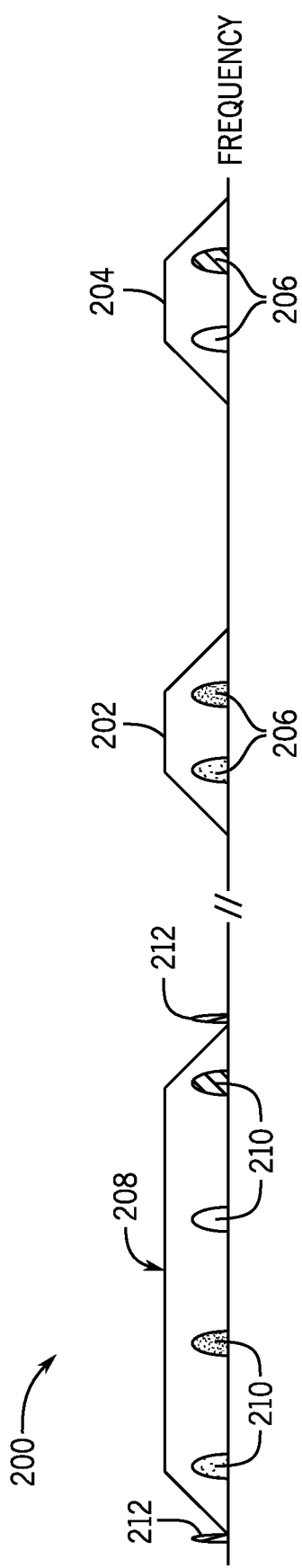
FIG. 4 is a frequency diagram of fifth generation (5G) New Radio (NR) Frequency Range 2 (FR2) signal carrier conversion by the user equipment of FIG. 1, according to embodiments of the present disclosure.

With the foregoing in mind, FIG. 4 is a frequency diagram 200 of 5G NR FR2 signal carrier down-conversion by the UE 10 of FIG. 1, according to embodiments of the present disclosure. As discussed herein, the UE 10 may be communicatively coupled to (e.g., transmit and/or receive wireless signals to and/or from) the FR2 wireless communication network 102. Furthermore, in transmitting and/or receiving the FR2 wireless signals, the UE 10 may utilize a heterodyne RF architecture (e.g., via a heterodyne transceiver 30) to down-convert the FR2 wireless signals (e.g., having frequencies in a first FR2 bandwidth 202 and a second FR2 bandwidth 204) to a lower frequency to reduce interference with other signals in the UE 10 and/or facilitate signal processing. For example, the heterodyne transceiver 30 may down-convert received FR2 wireless signal carriers 206 to an intermediate frequency range 208 as down-converted FR2 signal carriers 210 for signal processing before the wireless signals of the received FR2 wireless signal carriers 206 are used or processed by one or more components of the UE 10. Furthermore, as illustrated in FIG. 4, the received and/or transmitted FR2 signal carriers 206 may include aggregated non-contiguous FR2 bands, such as illustrated within the first FR2 bandwidth 202 and the second FR2 bandwidth 204. The UE 10 (e.g., via the heterodyne transceiver 30) may down-convert the FR2 signal carriers 206 in the first FR2 bandwidth 202 and the second FR2 bandwidth 204 to the intermediate frequency range 208 of the UE 10. For example, the received FR2 wireless signal carriers 206 may include frequencies above 24 gigahertz (GHz), between 24 GHz-52.6 GHz, and so on, whereas the down-converted FR2 signal carriers 210 in the intermediate frequency range 208 may be within a lower (e.g., intermediate) frequency range, such as 7-24 GHz, 10-24 GHz, 5-24 GHz, and so on.

Moreover, the FR2 wireless communication network 102 may determine (e.g., based on the received UE 10 capabilities) placement of the down-converted FR2 signal carriers 210 within the intermediate frequency range 208 based on a frequency bandwidth of each FR2 bandwidth (e.g., frequency range of the first FR2 bandwidth 202 and/or a frequency range of the second FR2 bandwidth 204) and/or a total aggregate frequency bandwidth of one or more FR2 bandwidths (e.g., the frequency range of the first FR2 bandwidth 202 plus the frequency range of the second FR2 bandwidth 204). However, in some embodiments, the intermediate frequency range 208 may be limited by capabilities of the UE 10 and/or subject to system constraints, such as crosstalk effects (e.g., leakage of signals into adjacent channels/bands 212). For example, as illustrated in FIG. 4, the UE 10 may be limited to down-converting the received FR2 signal carriers 206 of the first and second FR2 bandwidths 202, 204 to a defined portion of the intermediate frequency range 208, because other adjacent channels and/or bands 212 within the intermediate frequency range 208 may be allocated to receive/transmit additional wireless signals (e.g., Bluetooth). Moreover, as discussed herein, with the emergence of the 7-24 GHz wireless communication network(s) 106 (e.g., in the sixth generation (6G) spectrum, having 7-24 GHz signal carriers) that utilize a similar frequency range as the intermediate frequency range 208 to communicate (e.g., transmit/receive wireless signals), down-converting the FR2 signal carriers 206 to the intermediate frequency range 208 may interfere with the UE 10 capabilities of receiving signals from and/or transmitting signals to these 7-24 GHz wireless communication network(s) 106.

Figure 5:
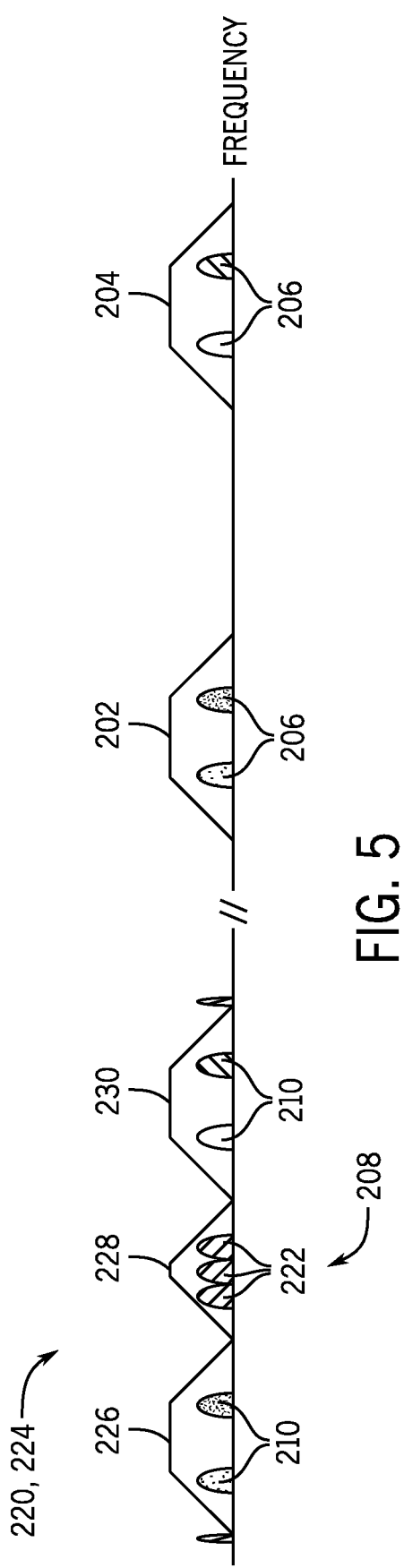
FIG. 5 is a frequency diagram of coexistence between down-converted FR2 signal carriers and 7-24 GHz signal carriers when the user equipment of FIG. 1 is operating in a static simultaneous configuration, according to embodiments of the present disclosure.
Figure 6:
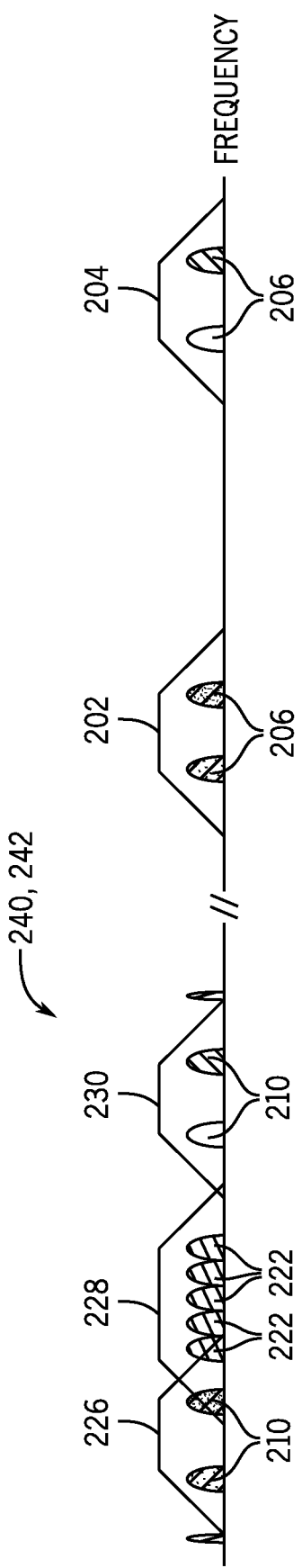
FIG. 6 is a frequency diagram of coexistence between down-converted FR2 signal carriers and 7-24 GHz signal carriers when the user equipment of FIG. 1 is operating in a dynamic non-simultaneous configuration, according to embodiments of the present disclosure.
Figure 7:
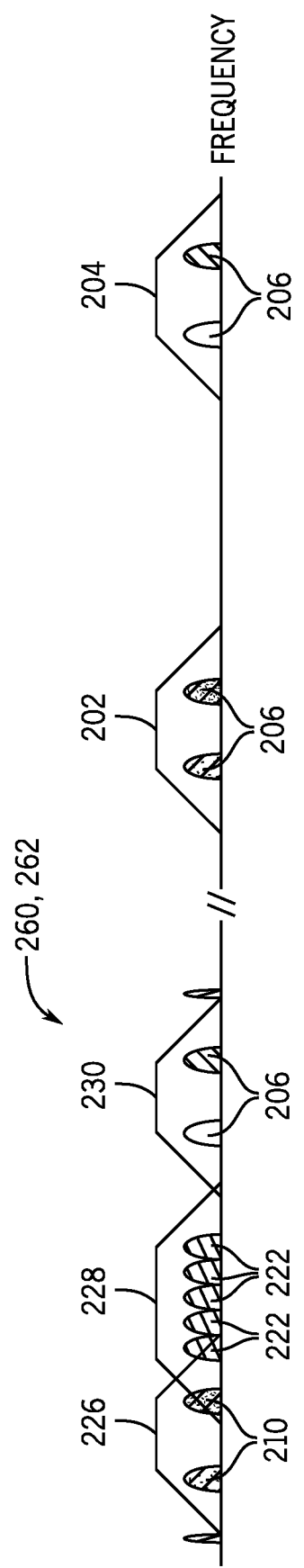
FIG. 7 is a frequency diagram of coexistence between down-converted FR2 signal carriers and 7-24 GHz signal carriers when the user equipment of FIG. 1 is operating in a dynamic simultaneous configuration, according to embodiments of the present disclosure.

Therefore, the present embodiments, as illustrated in FIGS. 5-7, provide methods and/or techniques that enable coexistence between various wireless communication network(s) (e.g., FR2 wireless communication network 102 and 7-24 GHz wireless communication network 106) communicatively coupled to the UE 10, such that the wireless signals of the various communication network(s) do not interfere on the UE 10. Furthermore, the UE 10 may provide (e.g., indicate) frequency band usage capabilities to the various wireless communication network(s) (e.g., including the 7-24 GHz wireless communication network 106 and/or the FR2 wireless communication network 102) to enable the various wireless communication network(s) to configured and/or schedule the UE 10 to support the various wireless communication network(s) and avoid interference. For example, as discussed herein, in some embodiments, the UE 10 may be configured (e.g., by the wireless communication network) to simultaneously support both FR2 signal carriers 206 in the 5G spectrum (e.g., including down-converted FR2 signal carriers 210) and 7-24 GHz signal carriers 222 in the 6G spectrum, in such a way that prevents interference between the wireless signals of the 7-24 GHz signal carriers 222 and the wireless signals of the down-converted FR2 signal carriers 210 in the intermediate frequency range 208 of the UE 10. In other words, the embodiments herein may enable the UE 10 to transmit and/or receive wireless signals having frequencies (e.g., a frequency range, a bandwidth) in both the 7-24 GHz frequency range and in the FR2 range.

In particular, FIG. 5 is a frequency diagram 220 of coexistence between FR2 signal carrier down-conversion and the 7-24 GHz signal carriers 222 when the UE 10 of FIG. 1 operates in a static simultaneous configuration 224, according to embodiments of the present disclosure. In particular, the UE 10 may inform (e.g., indicate to, provide to) the wireless communication network(s) (e.g., including the 7-24 GHz wireless communication network 106 and the FR2 wireless communication network 102) at which bands (e.g., frequency ranges) in the intermediate frequency range 208 (e.g., including the 7-24 GHz frequency range) that the UE 10 may transmit and/or receive the wireless signals. The wireless communication network(s) may then configure and/or schedule the UE 10 to transmit and/or receive wireless signals of both the FR2 wireless communication network 102 (e.g., within the FR2 signal carriers 206) and the 7-24 GHz wireless communication network 106 (e.g., within 7-24 GHz signal carriers 222). To do so, in some embodiments, the UE 10 may be configured to transmit and/or receive on the FR2 signal carriers 206 using a first transceiver (e.g., allocate at least one channel, such as the illustrated down-converted first channel 226 and third channel 230 in the intermediate frequency range 208) and to transmit and/or receive on the 7-24 GHz signal carriers 222 using a second transceiver (e.g., allocate at least one channel in the intermediate frequency range 208, such as the illustrated second channel 228 in the intermediate frequency range 208 different than the first and third channels 226, 230). It should be understood, that in some embodiments, the UE 10 may transmit and/or receive both the 7-24 GHz signal carriers 222 and the FR2 signal carriers 206 using a common transceiver.

As illustrated in FIG. 5, in some embodiments, the UE 10 may down-convert the received FR2 signal carriers 206 of the first FR2 bandwidth 202 and the received FR2 signal carriers 206 of the second FR2 bandwidth 204 to the first channel 226 and the third channel 230 within the intermediate frequency range 208, such that the first channel 226 and the third channel 230 do not interfere (e.g., the first channel 226 does not overlap with the third channel 230). For example, as illustrated in FIG. 5, the wireless communication network(s) may configure the UE 10 to transmit/receive signals using the FR2 signal carriers 206 in the first FR2 bandwidth 202 and converting, either up-converting the transmission signals or down-converting the receive signals, to the first channel 226 and to transmit/receive signals using the FR2 signal carriers 206 in the second FR2 bandwidth 204 and further converting, either up-converting the transmission signals or down-converting the receive signals, to the third channel 230. In addition, as illustrated in FIG. 5, the wireless communication network(s) may configure the UE 10 to transmit/receive signals using the 7-24 GHz signal carriers 222 in the second channel 228 that may be configured (e.g., placed) in a gap (e.g., a gap frequency range) between the first and the third channels 226, 230 (e.g., the down-converted FR2 signal carriers 210). In this way, signal carriers in the first, the second, and the third channels 226, 228, 230 do not overlap (e.g., interfere). Thus, the UE 10 may be configured and scheduled (e.g., by the wireless communication network(s)) to simultaneously transmit and/or receive signals using both the 7-24 GHz signal carriers 222 and the FR2 signal carriers 206 (e.g., and the down-converted FR2 signal carriers 210) in the intermediate frequency range 208 without interference between the wireless signals of the 7-24 GHz signal carriers 222 and the wireless signals of the down-converted FR2 signal carriers 210.

In additional or alternative embodiments, as illustrated in FIGS. 6 and 7, the UE 10 may indicate (e.g., provide) to the wireless communication network(s) (e.g., the FR2 wireless communication network 102 and/or the 7-24 GHz wireless communication network 106) capabilities (e.g., frequency band usage capabilities), such as which frequency band configurations (e.g., one or more channels) it may support (e.g., transmit/receive wireless signals via signal carriers of the one or more channels). In some embodiments, the wireless communication network(s) may configure the UE 10 to support the indicated frequency band configuration (e.g., the one or more channels) and further allocate (e.g., schedule) the signal carriers of the one or more channels of the indicated frequency band configuration along with one or more restrictions (e.g., time restrictions, frequency restrictions) to the UE 10.

Furthermore, the allocation may be dynamic (e.g., active), in that the wireless communication network(s) may schedule the UE 10 such that the UE 10 may dynamically transition from receiving/transmitting signals using all or at least a portion of the signal carriers (e.g., the FR2 signal carriers 206) of a first channel of a first wireless communication network (e.g., the FR2 wireless communication network 102) to receiving/transmitting signals using all or at least a portion of the signal carriers (e.g., the 7-24 GHz signal carriers 222) of a second channel of a second wireless communication network (e.g., the 7-24 GHz wireless communication network 106), or vice versa. The transitioning between receiving/transmitting signals of the first and second wireless communication networks may depend on the one or more signal characteristics associated with the first and/or second wireless communication network, such as a signal strength of a wireless signal of the respective wireless communication network(s). In addition, the transitioning between receiving/transmitting signals of the first and second wireless communication networks may depend on the indicated capabilities of the UE 10.

In particular, in some embodiments, the wireless communication network(s) may configure and/or schedule the UE 10 to actively transition communicating between the first and the second wireless communication networks based on the one or more restrictions. For example, the wireless communication network(s) may transmit a scheduling to the UE 10 along with one or more time domain restrictions, such that the UE 10 may transition operating between (e.g., transmitting and/or receiving signals from) the first wireless communication network to the second wireless communication network, and vice versa, based on one or more time domain restrictions. In additional or alternative embodiments, the wireless communication network(s) may transmit a scheduling to the UE 10 along with one or more frequency restrictions, such that the UE 10 may transition communicating between all or at least a portion of the signal carriers of the first wireless communication network and all or at least a portion of the second wireless communication network, and vice versa, based on the one or more frequency restrictions. In this way, the UE 10 may simultaneously support (e.g., transmit and/or receive signals on) at least a portion of the signal carriers of the first wireless communication network (e.g., one or more FR2 signal carriers 206 and thus one or more down-converted FR2 signal carriers 222 of the FR2 wireless communication network 102) and at least a portion of the signal carriers of the second wireless communication network (e.g., one or more 7-24 GHz signal carriers of the 7-24 GHz wireless communication network 106) that may otherwise interfere with each other.

With the foregoing in mind, FIG. 6 is a frequency diagram 240 of coexistence between FR2 signal carrier down-conversion and the 7-24 GHz signal carriers 222 when the UE 10 of FIG. 1 operates in a dynamic non-simultaneous configuration 242, according to embodiments of the present disclosure. In particular, the UE 10 may inform (e.g., indicate to, provide to) the wireless communication network(s) (e.g., including the 7-24 GHz wireless communication network 106 and the FR2 wireless communication network 102) at which bands (e.g., frequency ranges) in the intermediate frequency range 208 (e.g., including the 7-24 GHz frequency range) that the UE 10 may transmit and/or receive the wireless signals. The wireless communication network(s) may then configure and/or schedule the UE 10 to transmit and/or receive wireless signals of both the FR2 wireless communication network 102 (e.g., within the FR2 signal carriers 206) and the 7-24 GHz wireless communication network 106 (e.g., within 7-24 GHz signal carriers 222). To do so, in some embodiments, the UE 10 may be configured to transmit and/or receive on the FR2 signal carriers 206 using a first transceiver (e.g., allocate at least one channel, such as the illustrated down-converted first channel 226 and third channel 230 in the intermediate frequency range 208) and to transmit and/or receive on the 7-24 GHz signal carriers 222 using a second transceiver (e.g., allocate at least one channel in the intermediate frequency range 208, such as the illustrated second channel 228 in the intermediate frequency range 208 different than the first and third channels 226, 230). It should be understood, that in some embodiments, the UE 10 may transmit and/or receive both the 7-24 GHz signal carriers 222 and the FR2 signal carriers 206 using a common transceiver.

However, as illustrated in FIG. 6, at least a portion of one or more signal carriers (e.g., one or more channels and/or one or more signal carriers within the one or more channels) may overlap (e.g., interfere) with at least a portion of another one or more signal carriers within the intermediate frequency range 208 of the UE 10. For example, in FIG. 6, the down-converted FR2 signal carriers 210 (e.g., within the first channel 226 and/or the third channel 230) may overlap (e.g., interfere with) at least a portion of the 7-24 GHz signal carriers 222 (e.g., within the second channel 228) within the intermediate frequency range 208 of the UE 10. Therefore, the UE 10 may determine that one or more first signal carriers of the first wireless communication network overlap with one or more second signal carriers of a second wireless communication network and transmit an indication to the wireless communication network(s) of the UE 10 capabilities to support either the one or more first signal carriers or the one or more second signal carriers. Furthermore, based on the received capabilities transmitted by the UE 10, the wireless communication network (e.g., the FR2 wireless communication network 102 and/or the 7-24 GHz wireless communication network 106) may determine and transmit to the UE 10, one or more restrictions to enable (e.g., by transmitting a scheduling along with the one or more restrictions to the UE 10) the UE 10 to support either the one or more first signal carriers (e.g., a channels containing the one or more first signal carriers) or the one or more second signal carriers (e.g., a channel containing the one or more second signal carriers) within the intermediate frequency range 208. In this way, the wireless communication network(s) may configure and/or schedule the UE 10 to operate in the dynamic non-simultaneous configuration 242.

For example, as illustrated in FIG. 6, the wireless communication network may configure the second channel 228 (e.g., the 7-24 GHz signal carriers 222) in a gap (e.g., space, frequency range) between the first and the third channels 226, 230 (e.g., the down-converted FR2 signal carriers 210) in the intermediate frequency range 208 of the UE 10. Furthermore, the wireless communication network may determine one or more time domain restrictions based on the indicated capabilities received from the UE 10. The wireless communication network(s) may then schedule the UE 10 (e.g., transmit the scheduling along with the one or more time domain restrictions to the UE 10) to enable the UE 10 to dynamically and non-simultaneously support (e.g., transmit and/or receive wireless signal on) either the second channel 228 (e.g., the 7-24 GHz signal carriers 222) or the first channel 226 (e.g., the down-converted FR2 signal carriers 210) in the intermediate frequency range 208. In other words, both the 7-24 GHz signal carriers 222 and the FR2 signal carriers 206 (e.g., the down-converted FR2 signal carriers 210) are configured and scheduled with the one or more time domain restrictions. For example, as illustrated in FIG. 6, the wireless communication network(s) may configure the UE 10 to support the first channel 226, the second channel 228, and the third channel 230 in the intermediate frequency range 208. However, the wireless communication network(s) may schedule (e.g., allocate) the 7-24 GHz signal carriers 222 (e.g., to be supported on the second channel 228) and the FR2 signal carriers 210 (e.g., to be supported on the first channel 226) to the UE 10 along with the one or more time domain restrictions to enable the UE 10 to dynamically transition between a 7-24 GHz frequency operation (e.g., transmitting and/or receiving signals on the 7-24 GHz signal carriers 222 supported on the second channel 228) and a FR2 operation (e.g., transmitting and/or receiving signals on the FR2 signal carriers 206 that are down-converted (210) and supported on the first channel 226). In this way, the UE 10 may either communicate using the 7-24 GHz signal carriers 222 of the second channel 228 or the FR2 signal carriers 206 down-converted to the down-converted FR2 signal carriers 210 of the first channel 226 depending on the one or more time restrictions and/or an operation mode of the UE 10.

In particular, in some embodiments, the UE 10 may be configured and scheduled (e.g., by the wireless communication network(s)) to alternatively receive/transmit signals on either the first and the third channels 226, 230 (e.g., the down-converted FR2 signal carriers 210) or the second channel 228 (e.g., the 7-24 GHz signal carriers 222) in the intermediate frequency range 208, based on the one or more time restrictions transmitted by the wireless communication network(s) to the UE 10 and/or the operation mode of the UE 10. The operation mode (e.g., the 7-24 GHz frequency operation and/or the FR2 operation) may be based on the one or more signal characteristics associated with respective 7-24 GHz wireless communication networks 106 and/or FR2 wireless commination networks 102. Additionally, or alternatively, the operation mode may be based on the location of the UE 10 with respect to one or more base stations of the 7-25 GHz wireless communication network 106 and/or one or more base stations of the FR2 wireless communication network 102.

FIG. 7 is a frequency diagram 260 of coexistence between FR2 signal carrier down-conversion and 7-24 GHz signals carriers 222 when the UE 10 of FIG. 1 operates in a dynamic simultaneous configuration 262, according to embodiments of the present disclosure. In particular, as discussed herein, the UE 10 may inform (e.g., indicate to, provide to) the wireless communication network(s) (e.g., including the 7-24 GHz wireless communication network 106 and the FR2 wireless communication network 102) at which bands (e.g., frequency ranges) in the intermediate frequency range 208 (e.g., including the 7-24 GHz frequency range) that the UE 10 may transmit and/or receive the wireless signals. The wireless communication network(s) may then configure and/or schedule the UE 10 to transmit and/or receive wireless signals of both the FR2 wireless communication network 102 (e.g., within the FR2 signal carriers 206) and the 7-24 GHz wireless communication network 106 (e.g., within 7-24 GHz signal carriers 222). To do so, in some embodiments, the UE 10 may be configured to transmit and/or receive on the FR2 signal carriers 206 using a first transceiver (e.g., allocate at least one channel, such as the illustrated down-converted first channel 226 and third channel 230 in the intermediate frequency range 208) and to transmit and/or receive on the 7-24 GHz signal carriers 222 using a second transceiver (e.g., allocate at least one channel in the intermediate frequency range 208, such as the illustrated second channel 228 in the intermediate frequency range 208 different than the first and third channels 226, 230). It should be understood, that in some embodiments, the UE 10 may transmit and/or receive both the 7-24 GHz signal carriers 222 and the FR2 signal carriers 206 using a common transceiver.

However, in some embodiments, at least a portion of one or more signal carriers (e.g., one or more channels and/or one or more carriers within the one or more channels) may overlap (e.g., interfere) with at least a portion of another one or more signal carriers within the intermediate frequency range 208 of the UE 10. For example, as illustrated in FIG. 7, the down-converted FR2 signal carriers 210 (e.g., within the first channel 226 and/or the third channel 230) may overlap (e.g., interfere with) at least a portion of the 7-24 GHz signal carriers 222 (e.g., within the second channel 228) within the intermediate frequency range 208 of the UE 10. Therefore, the UE 10 may determine that one or more first signal carriers of the first wireless communication network overlap with one or more second signal carriers of a second wireless communication network and transmit an indication to the wireless communication network(s) of the UE 10 capabilities to support the one or more first signal carriers and the one or more second signal carries with one or more frequency band limits. Furthermore, based on the received capabilities transmitted by the UE 10, the wireless communication network (e.g., the FR2 wireless communication network 102 and/or the 7-24 GHz wireless communication network 106) may determine and transmit to the UE 10, one or more restrictions to enable (e.g., by transmitting a scheduling along with the one or more restrictions to the UE 10) the UE 10 to support a portion of the one or more first signal carriers (e.g., a portion of the 7-24 GHz signal carriers 222) and a portion of the one or more second signal carriers (e.g., a portion of the FR2 signal carriers 206) in the intermediate frequency range 208 at the same time. In this way, the wireless communication network(s) may configured and/or schedule the UE 10 to operate in the dynamic simultaneous configuration 262.

For example, in FIG. 7, the wireless communication network may configure the second channel 228 (e.g., the 7-24 GHz signal carriers 222) in a gap (e.g., space, frequency range) between the first and the third channels 226, 230 (e.g., the down-converted FR2 signal carriers 210) in the intermediate frequency range 208 of the UE 10. Furthermore, the wireless communication network may determine one or more frequency restrictions (e.g., frequency range limits of the one or more channels) based on the indicated capabilities received from the UE 10. The wireless communication network(s) may then schedule the UE 10 (e.g., transmit the scheduling along with the one or more frequency restrictions to the UE 10) to enable the UE 10 to dynamically and simultaneously support (e.g., transmit and/or receive wireless signal on) one or more of the 7-24 GHz signal carriers 222 (e.g., within a portion of the second channel 228 that is limited by the frequency restrictions) and one or more of the FR2 signal carriers 206 (e.g., the down-converted FR2 signal carriers 210 within the first channel 226 that is limited by the frequency restrictions) in the intermediate frequency range 208.

For instance, in some embodiments, the UE 10 may indicate (e.g., include in the indicated capabilities) to the wireless communication network(s) one or more frequency band limits (e.g., frequency range limits) to the one or more channels (e.g., containing the 7-24 GHz signal carriers 222 and/or the down-converted FR2 signal carriers 210) of the intermediate frequency range 208 of the UE 10. The one or more frequency band limits may be included in the UE 10 capabilities transmitted to the wireless communication network(s), or in some embodiments, the one or more frequency band limits may be transmitted separately to the wireless communication network(s). The wireless communication network(s) may then configure the UE 10 to support both the FR2 signal carriers 206 (e.g., and thus the down-converted FR2 signal carriers 210) and the 7-24 GHz signal carriers 222 and schedule the UE 10 to simultaneously receive at least a portion of (e.g., one or more of) the 7-24 GHz signal carriers 222 and at least a portion of (e.g., one or more of) the FR2 signal carriers 206 (e.g., the down-converted FR2 signal carriers 210) in the intermediate frequency range 208. In other words, both the 7-24 GHz signal carriers 222 and the FR2 signal carriers 206 (e.g., the down-converted FR2 signal carriers 210) are configured and scheduled with the one or more frequency restrictions. For example, as illustrated in FIG. 7, the wireless communication network(s) may configure the UE 10 to support the first channel 226, the second channel 228, and the third channel 230 in the intermediate frequency range 208. However, the wireless communication network(s) may schedule (e.g., allocate) the 7-24 GHz signal carriers 222 (e.g., to be supported on the second channel 228) and the FR2 signal carriers 210 (e.g., to be supported on the first channel 226) to the UE 10 along with the one or more frequency restrictions (e.g., corresponding to the one or more frequency band limits received from the UE 10), such that the UE 10 may simultaneously receive at least a portion of the FR2 signal carriers 206 (e.g., the down-converted FR2 signal carriers 210) and at least a portion of the 7-24 GHz signal carriers 222 within the intermediate frequency range 208 without interference between the wireless signals of the 7-24 GHz signal carriers 222 and the wireless signals of the down-converted FR2 signal carriers 210.

Furthermore, as illustrated in FIG. 7, the UE 10 may be configured and scheduled (e.g., by the wireless communication network(s)), based on the one or more frequency restrictions, to alternatively receive/transmit signals on either a portion (e.g., one or more signal carriers) of the first channel 226 and an entirety of the second channel 228, a portion of the second channel 228 and an entirety of the first channel 226, or a portion of the first channel 226 and a portion of the second channel 228 in the intermediate frequency range 208. Furthermore, based on the one or more frequency restrictions, the wireless communication network(s) may deactivate (e.g., mute, not schedule) or activate one or more signal carriers of the one or more channels (e.g., one or more of the 7-24 GHz signal carriers 222 on the second channel 228 and/or one or more of the down-converted FR2 signal carriers 210 on the first channel 226) that are overlapping and/or interfering with one another within the intermediate frequency range 208 of the UE 10. For example, the wireless communication network(s) may deactivate or activate one or more signal carriers by utilizing a Media Access Control (MAC) layer to dynamically mute (e.g., deactivate) or alternatively activate at least a portion (e.g., particular channels and/or carriers) of the FR2 signal carriers 206 (e.g., thus the down-converted FR2 signal carriers 210) and/or the 7-24 GHz signal carriers 222 that may be determined to be outside of the one or more frequency limits (e.g., may interfere with each other within the intermediate frequency range 208 of the UE 10). In this way, the wireless communication network(s) may enable the UE 10 to simultaneously communicate via two or more different wireless communication network(s) that may include one or more signal carriers that are overlapping on the UE 10. Furthermore, the UE 10 may simultaneously receive/transmit signals on at least a portion of both the FR2 signal carriers 206 and 7-24 GHz signal carriers 222 without a latency penalty associated with handover techniques.

In some embodiments, the simultaneous communication may be dynamic in that the wireless communication network(s) may configure and/or schedule the UE 10 to actively switch between utilizing one or more of the FR2 signal carriers 206 (e.g., one or more of the down-converted FR2 signal carriers) and one or more of the 7-24 GHz signal carriers 210 in the intermediate frequency range 208, based on the one or more frequency band limits received from the UE 10. In particular, the one or more frequency restrictions may correspond (e.g., correlate) to the one or more frequency band limits determined by the UE 10. Furthermore, the one or more frequency band limits may change (e.g., be adjusted) by the UE 10 based on the one or more signal characteristics of the respective wireless communication network(s). For example, the UE 10 may adjust a frequency band limit of the available bandwidth (e.g., channel) to support the 7-24 GHz signal carriers 222 based on a measured signal strength of the signals of the 7-24 GHz wireless communication network 106 communicatively coupled to the UE 10. In this way, the one or more frequency restrictions determined by the wireless communication network(s) may change (e.g., be adjusted) based on the received UE 10 capabilities including the one or more frequency band limits. Furthermore, as discussed herein, the wireless communication network(s) may determine the one or more frequency restrictions based on the one or more signal characteristics received from the UE 10 (e.g., one or more signal characteristics of the wireless signals of the 7-24 GHz wireless communication network 106 and/or one or more signal characteristics of the signals of the FR2 wireless communication network 102. The one or more frequency restrictions may also be based on (e.g., adjusted, changed based on) the location of the UE 10 within the 7-24 GHz coverage area of the 7-24 GHz wireless communication network 106 and/or the FR2 coverage area of the FR2 wireless communication network 102.

With the foregoing in mind, Table 1 illustrates example scenarios of the static simultaneous, the dynamic non-simultaneous, and the dynamic simultaneous configurations of the UE 10 of FIG. 1. For example, the UE 10 may be able to communicate via wireless signals on both Band A in the 7-24 GHz frequency range and to communicate via wireless signals on Band B in the FR2 range (e.g., and thus the down-converted signals of Band B in the intermediate range 208). Further, the UE 10 may indicate to the wireless communication network(s) its capabilities of communicating via the wireless signals in the 7-24 GHz frequency range and/or down-converted wireless signals of the FR2 range. The UE capabilities may include one or more frequency band limits (e.g., frequency range limits) for supporting 7-24 GHz signal carriers on the Band A and/or the down-converted FR2 signal carriers on the Band B within the intermediate frequency range 208. As seen in Table 1, the resulting configuration and/or scheduling transmitted to the UE 10 from the wireless communication network, which may include one or more restrictions, may be based on the capabilities of the UE 10 transmitted by the UE 10 to the wireless communication network(s).

signal carriers in the 7-24 GHz frequency range) and Band B (e.g., down-converted FR2 signal carriers 210). Further, as seen for the static simultaneous configuration 224, the UE 10 transmits an indication to the wireless communication network(s) of no frequency range limits for either Band A or Band B, and in this case, Band A and down-converted signals of Band B do not interfere (e.g., overlap) within the intermediate frequency range 208. Thus, the wireless communication network(s) may configure and schedule the UE 10 to support wireless signals on both Band A and Band B with no restrictions to the bandwidth (e.g., the frequency range) of either Band A or Band B.

As another example, row 2 of Table 1 is an example of the dynamic non-simultaneous configuration 242, as further illustrated in FIG. 6. As discussed herein, the UE 10 may transmit an indication to the wireless communication network of the capabilities of the UE 10 to support wireless signals on Band A and Band B. The wireless communication network(s) may then configure the UE 10 to support wireless signals on both Band A (e.g., 7-24 GHz signal carriers in the 7-24 GHz frequency range) and Band B (e.g., down-converted FR2 signal carriers 210). Further, as seen for the dynamic non-simultaneous configuration 242, the UE 10 may transmit an indication to the wireless communication network(s) of no frequency range limits for either Band A or Band B, however in this case, the UE 10 may determine that Band A and down-converted signals of Band B interfere (e.g., overlap) in the intermediate frequency range 208 of the UE 10 may additionally indicate to the wireless communication network(s) its capabilities of supporting wireless

TABLE 1

Examples of Usage Type Scenarios

| | UE Capabilities | | | | |
|---|---|---|---|---|---|
| Operation Configurations | Band A | Band B | Frequency range limit for Band A | Frequency range limit for Band B | Network Configuration/Scheduling |
| Static Simultaneous | 7-24 GHz frequency range | FR2 range | None | None | Band A and Band B are configured and used simultaneously with not restrictions. |
| Dynamic Non-simultaneous | 7-24 GHz frequency range | FR2 range | None | None | Band A and Band B are configured, but scheduled alternatively based on one or more time restrictions. |
| Dynamic Simultaneous | 7-24 GHz frequency range | FR2 range | None | 500 MHz | Band A and Band B are configured and used simultaneously with Band B total frequency range limited to 500 MHz. |
| Dynamic Simultaneous | 7-24 GHz frequency range | FR2 range | 100 MHz | 1 GHz | Band A and Band B are configured and used simultaneously with Band A total frequency range limited to 100 MHz and Band B total frequency range limited to 1 GHz. |

For example, row 1 of Table 1 is an example of the static simultaneous configuration 224, as illustrated in FIG. 5. As discussed herein, the UE 10 may transmit an indication to the wireless communication network(s) of the capabilities of the UE 10 to support wireless signals (e.g., one or more signal carriers) on Band A and Band B. The wireless communication network(s) may then configure the UE 10 to support wireless signals on both Band A (e.g., 7-24 GHz signal on Band A and Band B non-simultaneously (e.g., either supporting wireless signals on Band A or wireless signal on Band B at any given time). Thus, the wireless communication network(s) may configure the UE 10 to support wireless signals on both Band A and Band B, and schedule the UE 10 to alternatively support wireless signals on either Band A or Band B based on the one or more time domain restrictions.

Additionally or alternatively, rows 3 and 4 of Table 1 are an examples of the dynamic simultaneous configuration 262, as further illustrated in FIG. 7. As discussed herein, the UE 10 may transmit an indication to the wireless communication network of the capabilities of the UE 10 to support wireless signals on Band A and Band B. The wireless communication network(s) may then configure the UE 10 to support wireless signals on both Band A (e.g., 7-24 GHz signal carriers 222 in the 7-24 GHz frequency range) and Band B (e.g., down-converted FR2 signal carriers 210). Further, as seen for the dynamic simultaneous configuration 262 of row 3, the UE 10 may determine that at least a portion of the carriers of Band A interfere (e.g., overlap) with at least a portion of the down-converted carriers of Band B in the intermediate frequency range 208 of the UE 10. Thus, the UE 10 may transmit an indication to the wireless communication network(s) of no frequency range limit for Band A and a frequency range limit for Band B of 500 MHz. Further, the wireless communication network(s) may then configure the UE 10 to support wireless signals on both Band A and Band B, and schedule the UE 10 to support wireless signals on Band A and to support wireless signals on a portion of the signal carriers of Band B that is limited to a total bandwidth (e.g., frequency range) of 500 MHz. In other words, the UE 10 may be configured and scheduled to support wireless signals on Band A with no restrictions, and to support wireless signals on Band B with frequency restrictions that limit the total bandwidth of Band B to 500 MHz.

Furthermore, row 4 illustrates an additional example of the dynamic simultaneous configuration 262 of the UE 10, wherein the UE 10 may determine and transmit an indication to the wireless communication network(s) of a frequency range limit for Band A of 100 MHz and a frequency range limit for Band B of 1 GHz. Thus, the wireless communication network(s) may configure the UE 10 to support wireless signals on both Band A and Band B, and schedule the UE 10 to support wireless signals on a portion of Band A that is limited to 100 MHz and to support wireless signals on a portion of Band B that is limited to 1 GHz. In other words, the UE 10 may be configured and scheduled to support wireless signals on Band A with restrictions that limit the total bandwidth of Band A to 100 MHz and to support wireless signals on Band B with restrictions that limit the total bandwidth of Band B to 1 GHz. It should be understood that the determined frequency range limits of either Band A (e.g., 7-24 GHz signal carriers 222 in the 7-24 GHz frequency range) and/or Band B (e.g., FR2 signal carriers 210) may be of any suitable frequency range limit (e.g., 200 MHz, 800 MHz, 80 MHz, etc.) so as to enable the UE 10 to operate in the static simultaneous, the dynamic non-simultaneous, and the dynamic simultaneous configurations.

Figure 8:
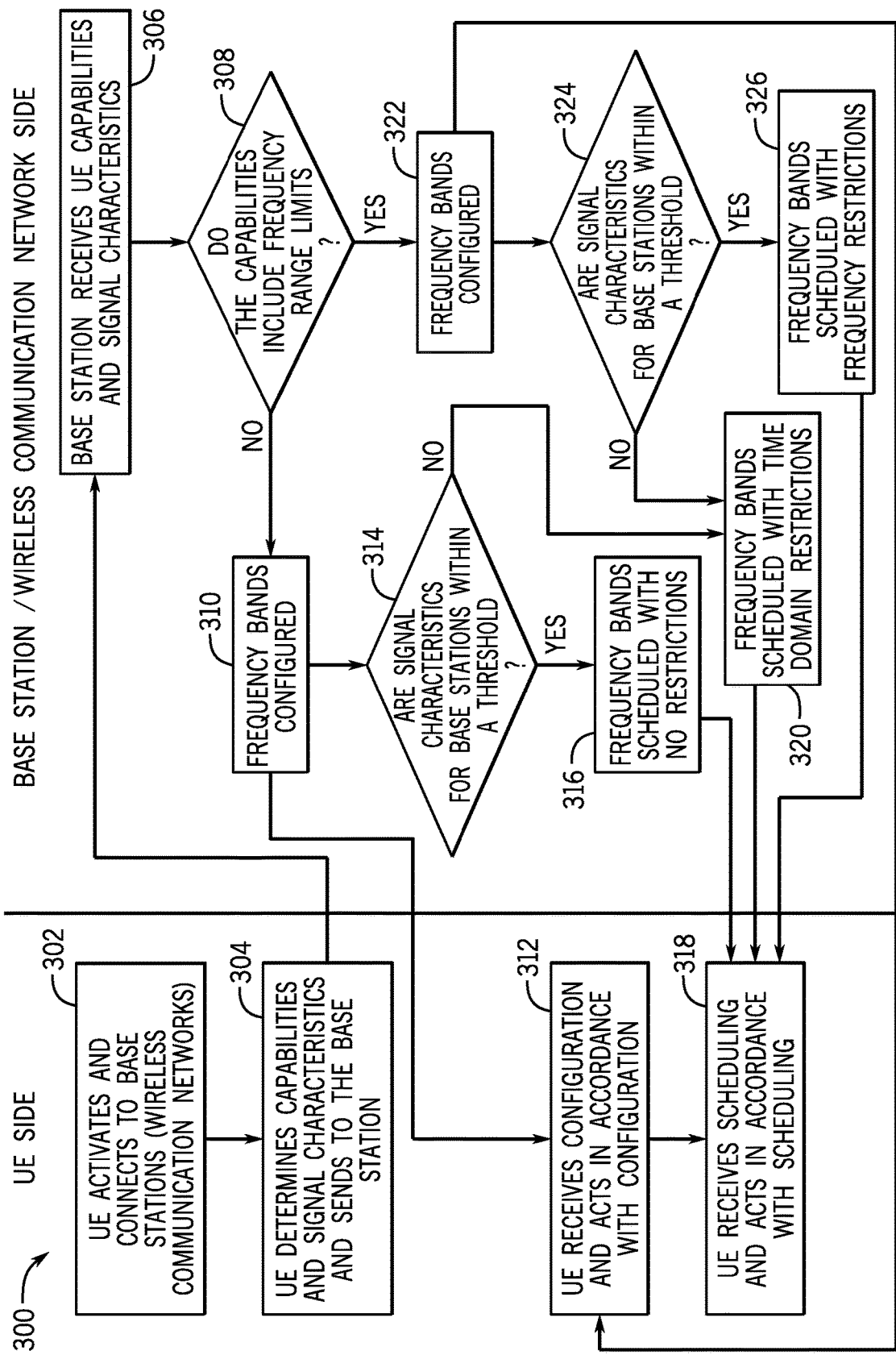
FIG. 8 is a flow chart of a method for base station configuration and scheduling of the user equipment of FIG. 1 based on frequency band usage capabilities of the user equipment, according to embodiments of the present disclosure.

FIG. 8 is a flow chart of the method 300 for base station configuration and scheduling (e.g., configuration and scheduling by the wireless communication network(s), such as the FR2 wireless communication network 102 and/or the 7-24 GHz wireless communication network 106) of the UE 10 of FIG. 1 based on the frequency band usage capabilities of the UE 10 and/or one or more signal characteristics associated with a respective base station communicatively coupled to the UE 10, according to embodiments of the present disclosure. Any suitable device (e.g., a controller) that may control components of the UE 10, the wireless communication network(s) (e.g., the FR2 wireless communication network 102, the 7-24 GHz wireless communication network 106), and/or the base station (e.g., the FR2 base stations 104, 124, the 7-24 GHz base stations 108, 120, 128), such as the processor 12, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system of the UE 10, the wireless communication network(s) 74, and/or the base stations, one or more software applications of the UE 10, the wireless communication network(s), and/or the base stations, and the like. While the method 300 is describe with respect to the first wireless communication network and the second wireless communication network, it should be appreciated that any suitable number of wireless communication network(s) may implement the methods described herein. Furthermore, while the method 300 is described using steps in a specific sequence, it should be understood that the present disclosure contemplates that the described steps may be performed in different sequences than the sequence illustrated, and certain described steps may be skipped or not performed altogether.

In process block 302, the UE 10 may activate and connect to (e.g., communicatively couple to, establish communication with) one or more base stations associated with a first wireless communication network and a second wireless communication network (e.g., one or more of the FR2 base stations 104, 124 of the FR2 wireless communication network 102 and one or more of the 7-24 GHz base stations 108, 120, 128 of the 7-24 GHz wireless communication network 106). Each of the base stations may advertise, broadcast, or otherwise transmit radio frequency (RF) signals and the UE 10 may detect the base stations by receiving the RF signals when the UE 10 enters the coverage area of the base stations (e.g., a geographical region for which the base station provides network coverage). The base stations may each form a connection with the UE 10 and the UE 10 may send an indication of its frequency band usage capabilities and/or one or more signal characteristics associated with the respective base station to the base stations (e.g., the wireless communication network(s)). In particular, the UE 10 may synchronize to the base stations and the base stations may broadcast or transmit system information indicative of frequency bands supported by the base stations (e.g., one or more of the FR2 signal carriers 206 from the FR2 base stations 104, 124 and one or more of the 7-24 GHz signal carriers 222 from the 7-24 GHz base stations 108, 120, 128). The system information may also include timing specification, power specification, GPS or GNSS coordinates, and/or any other suitable information to enable the UE 10 to establish communication with each of the base stations.

In process block 304, the UE 10 may determine one or more frequency band usage capabilities and transmit an indication of the one or more frequency band usage capabilities to the base stations. In some embodiments, the frequency band usage capabilities may include the one or more frequency range limits associated with one or more channels (e.g., containing either the down-converted FR2 signal carriers 210 or the 7-24 GHz signal carriers 222) supported by the UE 10 (e.g., within the intermediate frequency range 208 of the UE 10). As discussed herein, the UE 10 may additionally and/or continually monitor the connection (e.g., link conditions) with each of the base stations the UE 10 is communicatively coupled to and determine the one or more signal characteristics associated with each of the base stations. The UE 10 may also transmit an indication of the one or more signal characteristics associated with each of the base stations to one or more base stations (e.g., the wireless communication network(s)).

In process block 306, the wireless communication network(s) (e.g., via the base stations) may receive the UE 10 frequency band usage capabilities and/or the one or more signal characteristics associated with the respective base stations from the UE 10. The wireless communication network(s) may additionally, in process block 308, determine whether any frequency band limits are included with the received frequency band usage capabilities of the UE 10. For example, the wireless communication network(s) may determine whether there are frequency band limits associated with one or more first frequency bands (e.g., one or more first channels containing one or more first signal carriers) of the first wireless communication network and/or one or more second frequency bands (e.g., one or more second channels containing one or more second signal carriers) of the second wireless communication network that may be indicated as supported by the UE 10 (e.g., in the intermediate frequency range 208 of the UE 10).

If the wireless communication network determines there are no frequency range limits included in the received usage capabilities of the UE 10, then, in process block 310, the wireless communication network may then configure the UE 10 to support the one or more first and second signal carriers of the first wireless communication network and the second wireless communication network. For example, the wireless communication network may configure the UE 10 to support both the FR2 signal carriers 206 (e.g., and thus the down-converted FR2 signal carriers 210) of the FR2 wireless communication network 102 and the 7-24 GHz signal carriers 222 of the 7-24 GHz wireless communication network 106. Furthermore, in process block 312, the UE 10 may receive the configuration from the base station (e.g., the wireless communication network(s)) and may support the one or more first signal carriers and the one or more second signal carriers in accordance with the received configuration. For example, the UE 10 may set (e.g., configure, adjust, tune) the transmitter 52 and/or the receiver 54 to respectively transmit and receive wireless signals at the frequency range of both the one or more first signal carriers and the one or more second signal carriers (e.g., configures filtering circuitry to filter for wireless signals of both the one or more first signal carriers and the one or more second signal carriers).

Additionally or alternatively, at process block 314, the wireless communication network may compare the one or more signal characteristics associated with each of the respective base stations. For example, the wireless communication network may compare a first set of signal characteristics associated with a first base station (e.g., the first wireless communication network) to a second set of signal characteristics associated with a second base station (e.g., the second wireless communication network), and determine if the first set of signal characteristics are relatively the same (e.g., equal to) the second set of signal characteristics. In other words, the wireless communication network may determine if a difference between the first set of signal characteristics and the second set of signal characteristics is within a threshold difference. Thus, the wireless communication network(s) may determine if communication performance (e.g., signal quality, signal strength, or another signal characteristic) of the first and second wireless communication networks is equal or similar (e.g., the difference between the one or more respective signal characteristics of the wireless communication network(s) are within a threshold difference of each other).

In addition, in process 316, if the wireless communication network determines the difference between the one or more respective signal characteristics (e.g., the first and the second set of signal characteristics) associated with the first and the second base stations of the first and the second wireless communication network are within a threshold difference and there are no frequency range limits included with the received UE 10 usage capabilities, then the wireless communication network may schedule (e.g., allocate) to the UE 10 the frequency bands (e.g., one or more signal carriers of the one or more channels) of both the first and the second communication network (e.g., the FR2 signal carriers 206 of the FR2 wireless communication network 102 and 7-24 GHz signal carriers 222 of the 7-24 GHz wireless communication network 106) with no restrictions (e.g., no frequency restrictions (frequency range limits) and/or no time domain restrictions)). In process block 318, the UE 10 may receive a scheduling from the base station (e.g., the wireless communication network) and act according with the received scheduling with no restrictions (e.g., the UE 10 may transmit and receive signals according to the scheduling (e.g., timing) transmitted by the wireless communication network(s)). For example, as illustrated in FIG. 5, the wireless communication network(s) may configure and schedule the UE 10 to operate in the static simultaneous configuration 224.

However, in process block 320, if the wireless communication network determines the difference between the one or more respective signal characteristics (e.g., the first and the second set of signal characteristics) associated with the first and the second base stations of the first and the second wireless communication network are not within the threshold difference (e.g., are not relatively the same) and there are no frequency range limits included with the received UE 10 usage capabilities, in some embodiments, the wireless communication network may schedule (e.g., allocate) to the UE 10 the frequency bands (e.g., one or more signal carriers of the one or more channels) of both the first and the second communication network (e.g., the FR2 signal carriers 206 of the FR2 wireless communication network 102 and 7-24 GHz signal carriers 222 of the 7-24 GHz wireless communication network 106) with one or more time domain restrictions, such that the one or more respective signal carriers of the first and the second wireless communication networks are allocated to the UE 10 at different, non-overlapping time periods (e.g., scheduled at different times). As discussed herein, the one or more time domain restrictions may be based on respective one or more signal characteristics associated with the first wireless communication network and the second wireless communication network. Furthermore, in process block 318, the UE 10 may receive a scheduling from the base station (e.g., the wireless communication network) and may act according with the received scheduling with the one or more time domain restrictions. For example, as illustrated in FIG. 6, the wireless communication network(s) may configure and schedule the UE 10 to operate in the dynamic non-simultaneous configuration 242.

Returning to process block 308, if the wireless communication network(s) determine that the received UE 10 usage capabilities include one or more frequency band limits (e.g., frequency band limit of the down-converted FR2 signal carriers 210 and/or the 7-24 GHz signal carriers 222), in process block 322, the wireless communication network may then configure the UE 10 to support the one or more first and second signal carriers of the first wireless communication network and the second wireless communication network. For example, the wireless communication network may configure the UE 10 to support both the FR2 signal carriers 206 (e.g., and thus the down-converted FR2 signal carriers 210) of the FR2 wireless communication network 102 and the 7-24 GHz signal carriers 222 of the 7-24 GHz wireless communication network 106. Furthermore, as discussed herein, in process block 312, the UE 10 may receive the configuration from the base station (e.g., the wireless communication network(s)) and may support the one or more first signal carriers and the one or more second signal carriers in accordance with the received configuration.

In process block 324, as discussed herein, the wireless communication network may compare the one or more signal characteristics associated with each of the respective base stations. For example, the wireless communication network may compare the first set of signal characteristics associated with the first base station (e.g., the first wireless communication network) to the second set of signal characteristics associated with the second base station (e.g., the second wireless communication network), and determine if the first set of signal characteristics are relatively the same (e.g., equal to) the second set of signal characteristics. In other words, the wireless communication network may determine if the difference between the first set of signal characteristics and the second set of signal characteristics is within the threshold difference. If the wireless communication network determines the difference between the one or more respective signal characteristics (e.g., the first and the second set of signal characteristics) associated with the first and the second base stations of the first and the second wireless communication network are within a threshold difference, in process block 326, then the wireless communication network may schedule (e.g., allocate) the frequency bands (e.g., one or more signal carriers of the one or more channels) of both the first and the second communication network (e.g., the FR2 signal carriers 206 of the FR2 wireless communication network 102 and 7-24 GHz signal carriers 222 of the 7-24 GHz wireless communication network 106) with one or more frequency restrictions (e.g., frequency range limits). In this way, the one or more respective channels (e.g., containing the one or more signal carriers) of the first and the second wireless communication network do not interfere (e.g., overlap) in the intermediate frequency range of the UE 10. Furthermore, in process block 318, the UE 10 may receive a scheduling from the base station (e.g., the wireless communication network) and may act according with the received scheduling including the one or more frequency restrictions. For example, as illustrated in FIG. 7, the wireless communication network(s) may configure and schedule the UE 10 to operate in the dynamic simultaneous configuration 262.

Returning to process block 324, if the wireless communication network determines the difference between the one or more respective signal characteristics (e.g., the first and the second set of signal characteristics) associated with the first and the second base stations of the first and the second wireless communication network are not within the threshold difference (e.g., are not relatively the same), then, in process block 320, as discussed herein, the wireless communication network may schedule (e.g., allocate) to the UE 10 the frequency bands (e.g., one or more signal carriers of the one or more channels) of both the first and the second communication network (e.g., the FR2 signal carriers 206 of the FR2 wireless communication network 102 and 7-24 GHz signal carriers 222 of the 7-24 GHz wireless communication network 106) with one or more time domain restrictions, such that the one or more respective signal carriers of the first and the second wireless communication networks are allocated to the UE 10 at different, non-overlapping time periods (e.g., scheduled at different times). As discussed herein, the one or more time domain restrictions may be based on respective one or more signal characteristics associated with the first wireless communication network and the second wireless communication network. Furthermore, in process block 318, the UE 10 may receive a scheduling from the base station (e.g., the wireless communication network) and may act according with the received scheduling with the one or more time domain restrictions. For example, as illustrated in FIG. 6, the wireless communication network(s) may configure and schedule the UE 10 to operate in the dynamic non-simultaneous configuration 242.

It should be understood that a single wireless network (e.g., an FR2 network or a 7-24 GHz network) may perform the process blocks 306, 308, 310, 314, 316, 320, 322, 324, 326), or multiple wireless networks may perform the process blocks (e.g., the FR2 network or and the 7-24 GHz network). In this manner, the method 300 may enable one or more base station(s) of the networks to configure and schedule the UE 10 based on the frequency band usage capabilities of the UE 10 and/or one or more signal characteristics associated with the base station.

In an embodiment, a base station comprises: a transmitter; a receiver; and one or more processors coupled to the transmitter and the receiver. The one or more processors are configured to receive a first indication of a first available frequency sub-range of an intermediate frequency range that is available to communicate a first signal having a first frequency in the first available frequency sub-range at the receiver, receive a second indication of a second available frequency sub-range outside of the intermediate frequency range that is available to communicate a second signal having a second frequency in the second available frequency sub-range at the receiver, and transmit, using the transmitter, the first signal or the second signal based on the first indication and the second indication.

The intermediate frequency range may comprise between 7 gigahertz (GHz) and 24 GHz.

The second available frequency sub-range may be within a fifth generation (5G) Frequency Range 2.

The first indication may comprise a first signal characteristic of the first signal and the second indication may comprise a second signal characteristic of the second signal.

The one or more processors may be configured to determine a difference between the first signal characteristic and the second signal characteristic, and determine whether the difference meets a threshold difference.

The one or more processors may be configured to generate a configuration, schedule, or both, based on whether the difference meets the threshold difference.

The first signal characteristic and the second signal characteristic may each comprise a signal quality, signal-to-noise ratio, signal-to-interference and noise ratio, a signal strength, a signal power, a signal delivery, or any combination thereof.

The first indication, the second indication, or both may comprise a capability of user equipment communicatively coupled to the base station, and the one or more processors may be configured to determine a restriction based on the capability, and transmit, using the transmitter, the first signal or the second signal based on the restriction.

The restriction may comprise a time domain restriction, and the one or more processors may be configured to transmit, using the transmitter, the first signal during a time period that does not overlap with transmission of the second signal, or transmit, using the transmitter, the second signal during a time period that does not overlap with transmission of the first signal.

The restriction may comprise a frequency restriction of the first available frequency sub-range or the second available frequency sub-range, and the one or more processors may be configured to transmit, using the transmitter, the first signal or the second signal based on the frequency restriction.

The first indication or the second indication may comprise a frequency range limit within the first available frequency sub-range or the second available frequency sub-range. The frequency restriction may correspond to the frequency range limit.

In another embodiment, a method comprises: receiving a first indication of a first available frequency sub-range of an intermediate frequency range from an electronic device that is available to support a first signal carrier at a transceiver of a base station; receiving a second indication of a second available frequency sub-range outside of the intermediate frequency range from the electronic device that is available to support a second signal carrier at the transceiver; and transmitting, via the transceiver, a configuration to communicate using the first available frequency sub-range and the second available frequency sub-range based on the first indication and the second indication at the transceiver, wherein the electronic device is configured to convert a signal of the second available frequency sub-range to the intermediate frequency range.

The method may also comprise transmitting, via the transceiver, a schedule for communicating using the first available frequency sub-range during a first time period and communicating using the second available frequency sub-range during a second time period based on the first indication and the second indication at the transceiver.

The first indication may comprise a first signal characteristic of the first signal carrier and the second indication may comprise a second signal characteristic of the second signal carrier.

The method may also comprise determining a difference between the first signal characteristic and the second signal characteristic, and determining whether the difference meets a threshold difference.

The first signal characteristic and the second signal characteristic may each comprise a signal quality, signal-to-noise ratio, signal-to-interference and noise ratio, a signal strength, a signal power, a signal delivery, or any combination thereof.

In yet another embodiment, a tangible, non-transitory computer-readable medium comprises computer-readable instructions that, when executed by processing circuitry of a base station, are configured to cause the processing circuitry to: receive, at a receiver of the base station, a first indication of a first available frequency sub-range of an intermediate frequency range that is available to communicate a first signal from user equipment; receive, at the receiver, a second indication of a second available frequency sub-range outside of the intermediate frequency range that is available to communicate a second signal from the user equipment; and transmit, via a transmitter of the base station, a schedule for communicating using the first available frequency sub-range during a first time period and communicating using the second available frequency sub-range during a second time period based on the first indication and the second indication.

The first time period may not overlap with the second time period.

The first time period may overlap with the second time period.

The first indication or the second indication may indicate a capability of simultaneous communication using the first available frequency sub-range and using the second available frequency sub-range.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
 a transmitter;
 a first receiver;
 a second receiver; and
 one or more processors coupled to the transmitter, the first receiver, and the second receiver, the one or more processors configured to
  transmit, using the transmitter, a first indication of a first available frequency sub-range of an intermediate frequency range that is available to communicate signals,
  transmit, using the transmitter, a second indication of a second available frequency sub-range of a frequency range outside the intermediate frequency range that is available to communicate signals,
  receive a first signal having a first frequency in the first available frequency sub-range based on the first indication using the first receiver,
  receive a second signal having a second frequency in the second available frequency sub-range based on the second indication using the second receiver, and
  convert the second signal to a third frequency in the second available frequency sub-range of the intermediate frequency range.

2. The user equipment of claim 1, wherein the first frequency is between 7 gigahertz (GHz) and 24 GHz.

3. The user equipment of claim 2, wherein the intermediate frequency range comprises between 7 gigahertz (GHz) and 24 GHz.

4. The user equipment of claim 1, wherein the second frequency is within a fifth generation (5G) Frequency Range 2.

5. The user equipment of claim 1, wherein the first indication comprises a first signal characteristic of the first signal and the second indication comprises a second signal characteristic of the second signal, and the one or more processors are configured to receive the first signal using the first receiver and receive the second signal using the second receiver based on the first signal characteristic and the second signal characteristic.

6. The user equipment of claim 5, wherein the first signal characteristic and the second signal characteristic each comprise a signal quality, signal-to-noise ratio, signal-to-interference and noise ratio, a signal strength, a signal power, a signal delivery, or any combination thereof.

7. The user equipment of claim 1, wherein the first available frequency sub-range does not overlap with the second available frequency sub-range in the intermediate frequency range.

8. The user equipment of claim 1, wherein the first available frequency sub-range overlaps with the second available frequency sub-range in the intermediate frequency range, and the one or more processors are configured to receive the first signal using the first receiver, and receive the second signal using the second receiver based on a restriction.

9. The user equipment of claim 8, wherein the restriction comprises a time domain restriction, and the one or more processors are configured to receive the first signal using the first receiver during a first time period and receive the second signal using the second receiver during a second time period that does not overlap with the first time period.

10. The user equipment of claim 8, wherein the restriction comprises a frequency restriction of the first available frequency sub-range or the second available frequency sub-range, and the one or more processors are configured to receive the first signal using the first receiver and receive the second signal using the second receiver based on the frequency restriction.

11. The user equipment of claim 10, wherein the first indication comprises a first frequency range limit within the first available frequency sub-range, the frequency restriction corresponding to the first frequency range limit.

12. A method comprising:
transmitting, via a transceiver of an electronic device, a first indication of a first available frequency sub-range of an intermediate frequency range that is available to support a first signal carrier;
transmitting, via the transceiver, a second indication of a second available frequency sub-range of a frequency range outside of the intermediate frequency range that is available to support a second signal carrier;
receiving a configuration from a first network, a second network, or both, to communicate using the first available frequency sub-range and the second available frequency sub-range based on the first indication and the second indication at the transceiver, wherein processing circuitry of the electronic device is configured to convert a signal of the second available frequency sub-range to the intermediate frequency range; and
receiving a schedule from the first network, the second network, or both for communicating using the first available frequency sub-range during a first time period and communicating using the second available frequency sub-range during a second time period based on the first indication and the second indication at the transceiver.

13. The method of claim 12, comprising receiving a second signal having a frequency in the first available frequency sub-range using the transceiver.

14. The method of claim 12, comprising receiving the signal having a first frequency in the second available frequency sub-range using the transceiver, and converting, using the processing circuitry, the signal to have a second frequency in the intermediate frequency range.

15. The method of claim 12, wherein the first time period does not overlap with the second time period.

16. The method of claim 12, wherein the first time period overlaps with the second time period.

17. A tangible, non-transitory computer-readable medium, comprising computer-readable instructions that, when executed by processing circuitry of an electronic device, are configured to cause the processing circuitry to:
transmit, via a first transmitter of the electronic device, a first indication of a first available frequency sub-range of an intermediate frequency range that is available to transmit a first signal having a first frequency in the first available frequency sub-range;
transmit, via a second transmitter of the electronic device, a second indication of a second available frequency sub-range outside of the intermediate frequency range that is available to transmit a second signal having a second frequency in the second available frequency sub-range;
transmit, via the first transmitter, the first signal based on the first indication;
convert a third signal having a third frequency in the intermediate frequency range to the second signal having the second frequency based on the second indication; and
transmit, via the second transmitter, the second signal based on the second indication.

18. The tangible, non-transitory computer-readable medium of claim 17, wherein the second frequency is higher than the third frequency.

19. The tangible, non-transitory computer-readable medium of claim 17, wherein the third frequency is within the first available frequency sub-range, and the instructions are configured to cause the processing circuitry to receive a time domain restriction via a receiver of the electronic device, and transmit the first signal during a first time period via the first transmitter and transmit the second signal during a second time period via the second transmitter based on the time domain restriction, the first time period not overlapping with the second time period.

20. The tangible, non-transitory computer-readable medium of claim 17, wherein the third frequency is within the first available frequency sub-range, and the instructions are configured to cause the processing circuitry to receive a frequency restriction of the first available frequency sub-range via a receiver of the electronic device.

* * * * *